US012784506B2

(12) United States Patent
Liu et al.

(10) Patent No.: US 12,784,506 B2
(45) Date of Patent: Nov. 3, 2026

(54) LIVENESS DETECTION METHOD AND APPARATUS, AND COMPUTER DEVICE

(71) Applicant: TENCENT TECHNOLOGY (SHENZHEN) COMPANY LIMITED, Shenzhen (CN)

(72) Inventors: Shice Liu, Shenzhen (CN); Jing Yang, Shenzhen (CN); Jianghe Xu, Shenzhen (CN); Shuang Wu, Shenzhen (CN); Shouhong Ding, Shenzhen (CN); Jilin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 377 days.

(21) Appl. No.: 18/397,619

(22) Filed: Dec. 27, 2023

(65) Prior Publication Data

US 2024/0127631 A1 Apr. 18, 2024

Related U.S. Application Data

(63) Continuation of application No. PCT/CN2022/136604, filed on Dec. 5, 2022.

(30) Foreign Application Priority Data

Dec. 15, 2021 (CN) ......................... 202111538820.2

(51) Int. Cl.
*G06V 40/40* (2022.01)
*G06N 3/0464* (2023.01)
(Continued)

(52) U.S. Cl.
CPC ............ *G06V 40/45* (2022.01); *G06V 10/751* (2022.01); *G06V 10/774* (2022.01); *G06V 10/82* (2022.01); *G06V 40/171* (2022.01); *G06V 40/172* (2022.01)

(58) Field of Classification Search
USPC ................................. 382/118, 159, 155–156
See application file for complete search history.

(56) References Cited

U.S. PATENT DOCUMENTS

2018/0157899 A1 6/2018 Xu et al.
2018/0349682 A1* 12/2018 Wong .................. G06V 40/172
(Continued)

FOREIGN PATENT DOCUMENTS

CN 108537152 A 9/2018
CN 111368811 A 7/2020
(Continued)

OTHER PUBLICATIONS

Wang et al., From RGB to Depth: Domain Transfer Network for Face Anti Spoofing, 2021 IEEE 1556-6021, pp. 4280-4290. (Year: 2021).*
(Continued)

*Primary Examiner* — Ishrat I Sherali
(74) *Attorney, Agent, or Firm* — ANOVA LAW GROUP, PLLC

(57) ABSTRACT

A liveness detection method includes acquiring a facial image of an object and a reference feature set that includes a plurality of reference features conforming to a pre-set feature distribution; extracting an image feature from the facial image, performing liveness feature mapping on the plurality of reference features to obtain a plurality of corresponding reference liveness features, performing, based on the plurality of reference liveness features, liveness discrimination on the image feature to obtain a discrimination result, performing, based on the image feature, distribution fitting on the plurality of reference features to obtain a distribution fitting result, and performing liveness detection on the object based on the discrimination result and the distribution fitting result.

18 Claims, 7 Drawing Sheets

(51) Int. Cl.

| | |
|---|---|
| ***G06V 10/75*** | (2022.01) |
| ***G06V 10/774*** | (2022.01) |
| ***G06V 10/82*** | (2022.01) |
| ***G06V 40/16*** | (2022.01) |

(56) References Cited

U.S. PATENT DOCUMENTS

| | | | | |
|---|---|---|---|---|
| 2020/0257914 | A1* | 8/2020 | Wu | G06V 40/169 |
| 2021/0097260 | A1* | 4/2021 | Verma | G06V 10/449 |
| 2021/0209388 | A1* | 7/2021 | Ciftci | G06N 3/045 |
| 2023/0206700 | A1* | 6/2023 | Khan | G06V 40/165<br>382/116 |
| 2024/0205239 | A1* | 6/2024 | Bonev | G06V 40/193 |

FOREIGN PATENT DOCUMENTS

| | | | |
|---|---|---|---|
| CN | 111767900 | A | 10/2020 |
| WO | 2021147366 | A1 | 7/2021 |

OTHER PUBLICATIONS

Gao et al., Bimodal Face Recognition Based on Liveness Detection, 2018 IEEE 9787-1-7281-0770-7/19, pp. 1197-1202 (Year: 2019).*

The World Intellectual Property Organization (WIPO) International Search Report for PCT /CN2022/136604 Feb. 20, 2023 6 Pages (including translation).

The European Patent Office (EPO) The Extended European Search Report for Application No. 22906301.1 Feb. 13, 2025 9 Pages.

Zhuoyi Zhang et al. "Two-stream convolutional networks for multi-frame face anti-spoofing." Arxiv.org, Cornell university library, 201 OLIN library Cornell university Ithaca, Aug. 9, 2021.

* cited by examiner

LIVENESS DETECTION METHOD AND APPARATUS, AND COMPUTER DEVICE

CROSS-REFERENCE TO RELATED APPLICATIONS

This application is a continuation of International Application No. PCT/CN2022/136604, filed on Dec. 5, 2022, which claims priority to Chinese Patent Application No. 202111538820.2, entitled "LIVENESS DETECTION METHOD AND APPARATUS, AND COMPUTER DEVICE" filed with the China National Intellectual Property Administration on Dec. 15, 2021, which are incorporated by reference in their entirety.

FIELD OF THE TECHNOLOGY

This application relates to the field of computer technologies, and specifically, to a liveness detection method and apparatus, and a computer device.

BACKGROUND OF THE DISCLOSURE

With the development of the artificial intelligence technology, facial recognition technology has been widely applied to fields such as security, protection, and finance. In a facial recognition process, in addition to identity verification, liveness detection is needed. Liveness detection refers to an operation for determining whether a to-be-detected object in identity verification is a real live person rather than, for example, a photo, a video, or a mask. Liveness detection can effectively help resist attack methods such as a photo, a video, or a mask, thereby assisting a user to identify fraudulent behavior and protecting user's interests.

In the related art, when the artificial intelligence technology is applied to liveness detection, an artificial intelligence model is usually trained by using samples of known types of attacks to obtain a liveness detection model. Then, a to-be-detected object is detected by using the liveness detection model obtained by training. However, the current artificial intelligence technology is a data-driven learning method. Therefore, the accuracy of prediction of the liveness detection model for a known type of attack is higher. In response to that a type of attack is a type unknown to the liveness detection model, the accuracy of prediction of the liveness detection model will be affected. Accordingly, the accuracy and reliability of liveness detection will be affected.

SUMMARY

In accordance with the disclosure, there is provided a liveness detection method including acquiring a facial image of an object and a reference feature set that includes a plurality of reference features conforming to a pre-set feature distribution; extracting an image feature from the facial image, performing liveness feature mapping on the plurality of reference features to obtain a plurality of corresponding reference liveness features, performing, based on the plurality of reference liveness features, liveness discrimination on the image feature to obtain a discrimination result, performing, based on the image feature, distribution fitting on the plurality of reference features to obtain a distribution fitting result, and performing liveness detection on the object based on the discrimination result and the distribution fitting result.

Also in accordance with the disclosure, there is provided a computer device including one or more memories storing one or more application programs and one or more processors configured to run the one or more application programs to acquire a facial image of an object and a reference feature set that includes a plurality of reference features conforming to a pre-set feature distribution, extract an image feature from the facial image, perform liveness feature mapping on the plurality of reference features to obtain a plurality of corresponding reference liveness features; perform, based on the plurality of reference liveness features, liveness discrimination on the image feature to obtain a discrimination result, perform, based on the image feature, distribution fitting on the plurality of reference features to obtain a distribution fitting result, and perform liveness detection on the object based on the discrimination result and the distribution fitting result.

Also in accordance with the disclosure, there is provided a computer-readable storage medium storing a plurality of instructions that, when loaded and executed by a processor, cause the processor to acquire a facial image of an object and a reference feature set that includes a plurality of reference features conforming to a pre-set feature distribution, extract an image feature from the facial image, perform liveness feature mapping on the plurality of reference features to obtain a plurality of corresponding reference liveness features; perform, based on the plurality of reference liveness features, liveness discrimination on the image feature to obtain a discrimination result, perform, based on the image feature, distribution fitting on the plurality of reference features to obtain a distribution fitting result, and perform liveness detection on the object based on the discrimination result and the distribution fitting result.

BRIEF DESCRIPTION OF THE DRAWINGS

In order to describe the technical solutions of the embodiments of this application more clearly, the following briefly introduces the accompanying drawings required for describing the embodiments. Apparently, the accompanying drawings in the following description show only some embodiments of this application, and those skilled in the art may derive other drawings from these accompanying drawings without involving any creative effort.

DESCRIPTION OF EMBODIMENTS

Figure 1:
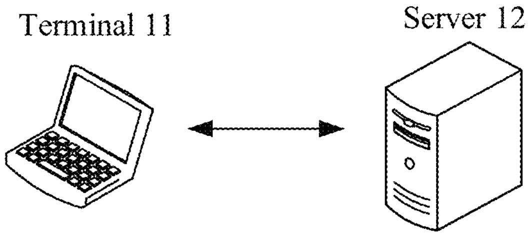
FIG. 1 is a schematic diagram of a scenario of a liveness detection method according to an embodiment of this application.

Technical solutions in embodiments of this application will be clearly described below with reference to the accompanying drawings in the embodiments of this application. Apparently, the described embodiments are merely some rather than all of the embodiments of this application. All other embodiments obtained by those skilled in the art based on the embodiments of this application without involving any creative effort shall fall within the scope of this application.

With the rapid development of the artificial intelligence technology, the artificial intelligence technology has been applied to more and more application scenarios. For example, the artificial intelligence technology may be applied to liveness detection. For example, deep learning or reinforcement learning may be applied to liveness detection. For example, a specific scenario may be that when a user logs into a certain service requiring identity verification in instant messaging software, the identity of the user may be recognized and verified by invoking a liveness detection function. In another scenario, when a user logs in a game, liveness detection is performed, in response to that the user is identified as a minor, a timer is started from the beginning of the game, and the game automatically exits when a certain threshold is reached, to prevent the minor user from becoming addicted. Users' faces and other data mentioned in this application are all data authorized by the users or from legal sources.

In an embodiment, when the artificial intelligence technology is applied to liveness detection, the whole process may be divided into three phases, which are a training phase, a test phase, and a prediction phase, respectively.

In the training phase, an artificial intelligence model is trained by using a training set, so that the trained artificial intelligence model may realize a liveness detection function.

In the test phase, the trained artificial intelligence model is tested by using a test set, so that whether the performance of the trained artificial intelligence model meets the requirements is determined based on a test result. In response to that the performance of the trained artificial intelligence model meets the requirements, the trained artificial intelligence model may be put into use, that is, the prediction phase is started. However, in response to that the performance of the trained artificial intelligence model does not meet the requirements, the trained artificial intelligence model is trained again until the performance of the trained artificial intelligence model meets the requirements.

In an embodiment, the existing liveness detection method is usually a framework composed of feature extraction and feature classification. In the conventional liveness detection method, a feature, such as an artificially designed local binary pattern (LBP), is extracted, and the feature is inputted into a support vector machine (SVM) for classification into a real person or an attack.

The LBP and other features used in the existing liveness detection method are artificially designed features. Therefore, limited by artificial design experience, the liveness detection method based on such features usually fails when encountering a sample that cannot be distinguished based on this pattern. Secondly, machine learning methods represented by deep learning are all data-driven learning methods. For a test set that has the same source and distribution as a training set, deep learning can usually achieve high classification accuracy, which benefits from powerful feature extraction capabilities of deep learning. However, on the other hand, for a test set that has a big difference and does not have the same source and distribution as the training set, predication of deep learning is uncertain. Liveness detection involves various attack samples with unknown medium types, which will result in uncertain prediction in the prediction phase and greatly limit the expansibility of the existing liveness detection method.

In view of this, an embodiment of this application proposes a liveness detection method, to solve the problem in the existing liveness detection method.

Specifically, an embodiment of this application proposes a liveness detection method, which may be performed by a liveness detection apparatus. The liveness detection apparatus may be integrated into a computer device. The computer device may include, for example, at least one of a terminal or a server. That is, the liveness detection method according to the embodiments of this application may be performed by a terminal, or may be performed by a server, or may be jointly performed by a terminal and a server that can communicate with each other.

The terminal may be a smart phone, a tablet computer, a notebook computer, a personal computer (PC), a smart home, a wearable electronic device, a virtual reality (VR)/augmented reality (AR) device, an on-board computer, or the like. The server may be an intercommunication server or backend server between a plurality of heterogeneous systems, or may be an independent physical server, or may be a server cluster or distributed system composed of a plurality of physical servers, or may be a cloud server providing a basic cloud computing service such as a cloud service, a cloud database, cloud computing, a cloud function, cloud storage, a network service, cloud communication, a middleware service, a domain name service, a security service, and a big data and artificial intelligence platform, or the like.

In an embodiment, as shown in FIG. 1, which is a schematic diagram of an implementation environment of a liveness detection method according to an embodiment of this application, the implementation environment may include a terminal 11 and a server 12.

The terminal 11 may receive a liveness detection trigger instruction, collect a facial image of a to-be-detected object based on the liveness detection trigger instruction, and transmit the to-be-detected facial image to the server 12 for liveness detection.

The server 12 may be integrated with a liveness detection apparatus according to an embodiment of this application, to implement the liveness detection method according to the embodiments of this application.

In an embodiment, the server 12 may acquire the facial image transmitted by the terminal 11, and acquire a reference feature set, the reference feature set including a plurality of reference features conforming to a pre-set feature distribution; extract an image feature from the facial image; respectively perform liveness feature mapping on the plurality of reference features to obtain a plurality of corresponding reference liveness features; perform, based on the plurality of reference liveness features, liveness discrimination on the image feature to obtain a discrimination result of the image feature; perform, based on the image feature, distribution fitting on the plurality of reference features to obtain a distribution fitting result for the image feature; and perform, based on the discrimination result and the distribution fitting result, liveness detection on the to-be-detected object to obtain a liveness detection result. Then, the server 12 may transmit the liveness detection result to the terminal 11.

Detailed descriptions are provided below. The order of description of the following embodiments is not construed as limiting the preferred order of the embodiments.

The embodiments of this application will be described from the perspective of a liveness detection apparatus. The liveness detection apparatus may be integrated into a computer device. The computer device may be a server, a terminal or another device.

Figure 2:
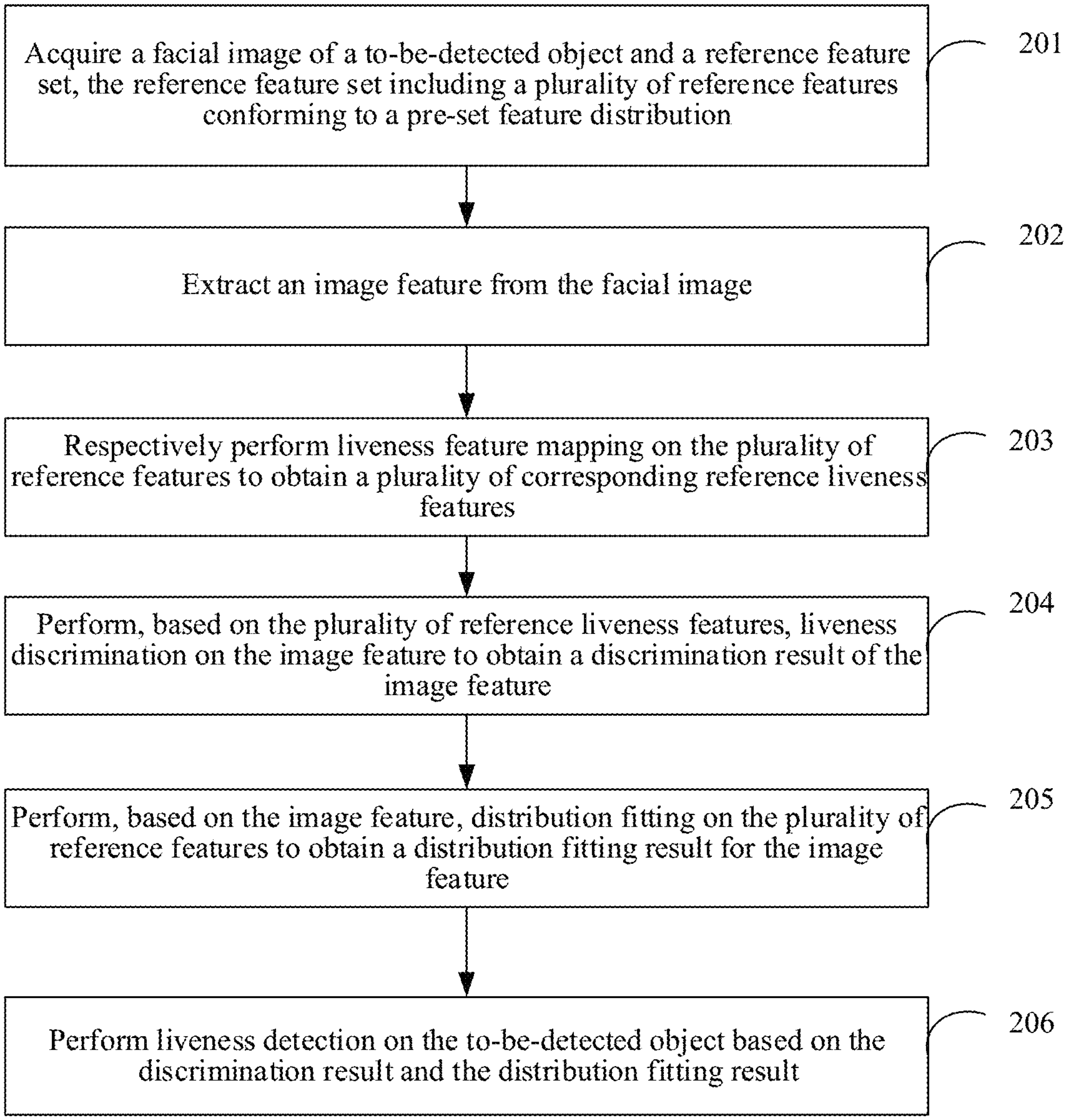
FIG. 2 is a schematic flowchart of a liveness detection method according to an embodiment of this application.

As shown in FIG. 2, a liveness detection method is provided. The method may be performed by a computer device. Specific procedures include step 201 to step 206.

Step 201: Acquire a facial image of a to-be-detected object and a reference feature set, the reference feature set including a plurality of reference features conforming to a pre-set feature distribution.

The to-be-detected object may include an object that needs to be subjected to liveness detection. For example, the to-be-detected object may include a user who needs to be subjected to liveness detection when subjected to identity verification by using a certain application program on the computer device.

Figure 3:
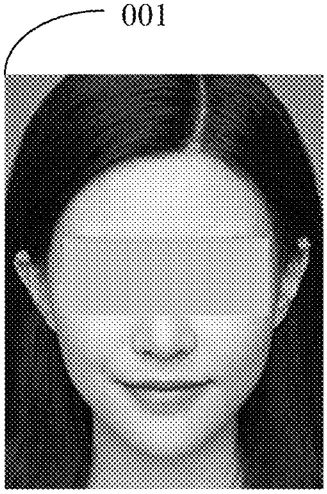
FIG. 3 is a schematic diagram of a scenario of a facial image according to an embodiment of this application.

The facial image may include an accurate and clear image of the face of the to-be-detected object. For example, the facial image may refer to an image in which the face of the to-be-detected object occupies most of the image area, the face of the to-be-detected object in the facial image is upright, and there is no face skewness or the like. For example, as shown in FIG. 3, 001 in FIG. 3 may be a schematic diagram of the facial image.

In an embodiment, in the existing liveness detection method, whether the to-be-detected object is a live person is usually determined based on a feature such as a local binary pattern. The so-called live person refers to the to-be-detected object, that is, the user who needs to be subjected to identity verification. However, the feature, such as the local binary pattern, is generally based on artificial design and relies on artificial design experience. Therefore, the liveness detection method based on such features usually fails when encountering a sample that cannot be distinguished based on this pattern. In order to better prevent known types of attacks and unknown types of attacks, according to the embodiments of this application, a liveness feature may be learned from a liveness feature distribution. The liveness feature is learned from the liveness feature distribution rather than being generated based on artificial experience, so determination of whether the to-be-detected object is a live person based on the liveness feature has better generalization and reliability. In the embodiments of this application, an attack refers to an identity verification method in which a non-live person (that is, a non-to-be-detected object) tries to steal the face of the to-be-detected object by imitating a live person (that is, the to-be-detected object), which specifically includes a printed human face paper, a human face image played in a video, a head model, headgear, and a mask that are made of various materials, and the like.

The reference feature set may be a set that includes data conforming to the pre-set feature distribution. The pre-set feature distribution may also be referred to as a target feature distribution. For example, the reference feature set may be a set that includes vectors conforming to the target feature distribution. As another example, the reference feature set may be a set that includes values conforming to the target feature distribution.

In an embodiment, in order to represent data in the reference feature set, the data in the reference feature set may be referred to as reference features. That is, the reference features in the reference feature set may refer to all data whose feature distributions conform to the target feature distribution.

The feature distribution may refer to the probability law shown by the reference features in the reference feature set. For example, the feature distribution may be a probability distribution. For example, the feature distribution may include a normal distribution, a standard normal distribution, a chi-squared distribution, a binomial distribution, and a Poisson distribution.

The target feature distribution may be a certain feature distribution to which the reference features in the reference feature set conform. For example, the target feature distribution may be a standard normal distribution. As another example, the target feature distribution may be a chi-squared distribution.

For example, in response to that the target feature distribution is a standard normal distribution, the reference feature set may be a set of vectors conforming to the standard normal distribution.

In an embodiment, the reference features in the reference feature set may be obtained by sampling. For example, several vectors may be obtained by sampling multi-dimensional vectors conforming to the standard normal distribution, and the vectors obtained by sampling are taken as the reference features. For example, there are 100 Gaussian vectors conforming to the standard normal distribution, and 50 vectors may be obtained by sampling the 100 Gaussian vectors and taken as the reference features. Sampling may be performed in multiple ways. For example, the reference features may be obtained by random sampling.

In an embodiment, the facial image of the to-be-detected object may be acquired in multiple ways. For example, the facial image of the to-be-detected object may be acquired directly or indirectly.

In an embodiment, in response to that the facial image of the to-be-detected object is acquired indirectly, the facial image may be acquired as follows.

For example, in response to that the computer device is a server, that is, the liveness detection apparatus is integrated into the server, the server may collect the facial image of the to-be-detected object through a terminal. Then, the terminal may transmit the collected facial image to the server, so that the server acquires the facial image of the to-be-detected object.

In an embodiment, in response to that the facial image of the to-be-detected object is acquired directly, the facial image may be acquired as follows.

For example, in response to that the computer device is a terminal with a camera, that is, the liveness detection apparatus is integrated into the terminal, the terminal may receive a liveness detection trigger instruction, and directly acquire the facial image of the to-be-detected object based on the liveness detection trigger instruction.

As another example, in response to that the computer device is a server with a camera, the server may receive a liveness detection trigger instruction, and directly acquire the facial image of the to-be-detected object based on the liveness detection trigger instruction.

In an embodiment, in response to that the facial image of the to-be-detected object is acquired directly, the computer may collect video data of the to-be-detected object through the camera, and detect the facial image from the video data.

Specifically, before the operation of "acquiring a facial image of a to-be-detected object," the method may include:

a liveness detection trigger instruction is received;

a to-be-detected video including the face of the to-be-detected object is collected based on the liveness detection trigger instruction;

the to-be-detected video is converted into at least one to-be-detected image;

facial detection is performed on the at least one to-be-detected image to obtain a detection result; and the facial image is determined from the at least one to-be-detected image based on the detection result.

The to-be-detected video is also referred to as a "target video." The liveness detection trigger instruction includes an instruction for triggering the liveness detection apparatus to perform liveness detection on the to-be-detected object. For example, the liveness detection apparatus may include a liveness detection trigger control. After the to-be-detected object triggers the liveness detection trigger control, the liveness detection apparatus will receive the liveness detection trigger instruction.

The to-be-detected image is also referred to as a "target image." In an embodiment, after receiving the liveness detection trigger instruction, the liveness detection apparatus may collect the to-be-detected video including the face of the to-be-detected object based on a liveness detection instruction. The liveness detection apparatus may convert the to-be-detected video into at least one to-be-detected image, in order to obtain the facial image. Then, the liveness detection apparatus may perform facial detection on the at least one to-be-detected image to obtain the detection result, and determine the facial image from the at least one to-be-detected images based on the detection result.

A method for converting the to-be-detected video into the to-be-detected image includes: the to-be-detected video is split into a plurality of video frames, and each video frame may be a to-be-detected image.

In an embodiment, the to-be-detected video may be converted into the to-be-detected image in multiple ways. For example, video editing software may be invoked, and the to-be-detected video is split into a plurality of video frames by using the function of the video editing software to obtain the to-be-detected image. As another example, the to-be-detected video may be converted into at least one to-be-detected image by using a video conversion function.

In an embodiment, after the to-be-detected image is obtained, facial detection may be performed on the to-be-detected image. Facial detection for the to-be-detected image may include determination of whether the to-be-detected video includes the face of the to-be-detected object. If it is determined that there is a to-be-detected image including the face of the to-be-detected object through facial detection, it indicates that the to-be-detected video includes the face of the to-be-detected object, and a subsequent operation will be performed. However, if it is determined that there is no to-be-detected image including the face of the to-be-detected object, it indicates that the to-be-detected video does not include the face of the to-be-detected object. In this case, the subsequent operation will not be performed, and the liveness detection apparatus will output a liveness detection failure result.

In an embodiment, in response to that the detection result is that there is a to-be-detected image including the face of the to-be-detected object, the facial image may be determined from the to-be-detected image.

In an embodiment, in response to that there is a to-be-detected image including the face of the to-be-detected object, facial discrimination may be first performed on the at least one to-be-detected image. An initial facial image may be filtered out from the at least one to-be-detected image through facial discrimination for the at least one to-be-detected image. The initial facial image may refer to a clearest image of the face of the to-be-detected object in a plurality of to-be-detected images. In addition, in order to improve the accuracy of liveness detection, after being filtered out, the initial facial image may be processed. For example, a region with the face only may be demarcated from the initial facial image and taken as the facial image. Specifically, the operation of "determining the facial image from the at least one to-be-detected image based on the detection result" may include:

facial discrimination is performed on the at least one to-be-detected image based on the detection result to obtain a discrimination result;

the initial facial image is filtered out from the at least one to-be-detected image based on the discrimination result;

facial registration is performed on the initial facial image to obtain a location of at least one facial key point in the initial facial image;

a target facial key point is filtered out from the at least one facial key point based on the location of the facial key point; and the facial image is generated based on a location of the target facial key point.

In an embodiment, facial discrimination may be performed on the to-be-detected facial image in multiple ways. For example, a deep learning network is trained by using image samples having faces and different resolutions to obtain a facial discrimination model capable of determining a resolution of an image. Then, facial discrimination may be performed on the at least one to-be-detected image by using the facial discrimination model to obtain the discrimination result. As another example, parameters, such as a variance and an entropy of grayscale, of the to-be-detected image may be further analyzed, and a discrimination result of each to-be-detected image is obtained by analyzing these parameters.

Then, the initial facial image may be filtered out from the at least one to-be-detected image based on the discrimination result. For example, a to-be-detected image at the highest resolution may be filtered out as the initial facial image.

In an embodiment, after being filtered out, the initial facial image may be processed. For example, a region with the face only may be demarcated from the initial facial image and taken as the facial image. Specifically, facial registration may be performed on the initial facial image to obtain at least one facial key point of the initial facial image. Then, the target facial key point is filtered out from the at least one facial key point, and the facial image is generated based on the target facial key point.

Facial registration is an image pre-processing method in which facial recognition is performed by locating key point coordinates of facial features. In this image pre-processing method, defined facial key points may be detected for subsequent facial recognition. A quantity of defined key points is a pre-set constant value, and may be defined based on different application scenarios. For example, the quantity of defined key points may be 5, 39 or 68. Facial registration for the initial facial image may be that the face in the initial facial image is located to obtain a specific location of the face in the initial facial image. The specific location of the face in the initial facial image may be represented by locations of the facial key points.

In an embodiment, facial registration may be performed on the initial facial image in multiple ways to obtain the locations of the facial key points in the initial facial image. For example, facial registration may be performed on the initial facial image by a method, such as a practical facial landmark detector (PFLD), an active shape model (ASM) or cascaded pose regression (CPR) model, to obtain the locations of the facial key points in the initial facial image.

Figure 4:
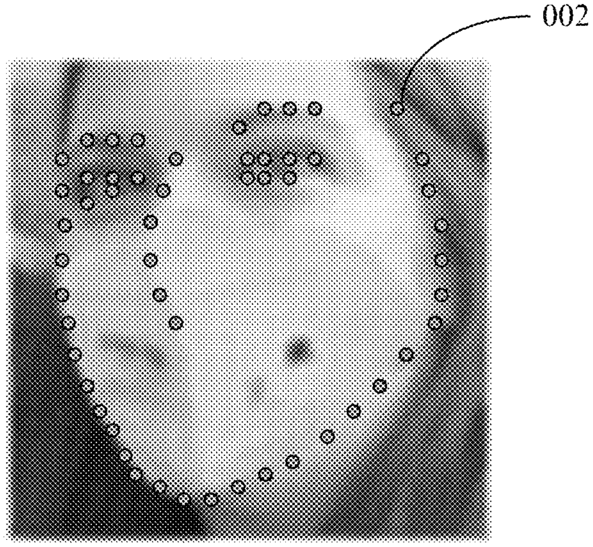
FIG. 4 is a schematic diagram of a scenario of a facial key point according to an embodiment of this application.

The facial key points may include key points capable of describing a facial contour and a facial part. For example, as shown in FIG. 4, 002 in FIG. 4 may be a schematic diagram of the facial key points.

The target facial key point may include a key point required for determining a facial part. The target facial key point may include key points corresponding to the left pupil, right pupil, nose tip, left mouth corner, and right mouth corner.

In an embodiment, the target facial key point may be filtered out from the at least one facial key point based on a location relationship between the facial key points. For example, the location of the facial key point is matched with a pre-set location, and in response to that the matching succeeds, the facial key point is taken as the target facial key point.

Figure 5:
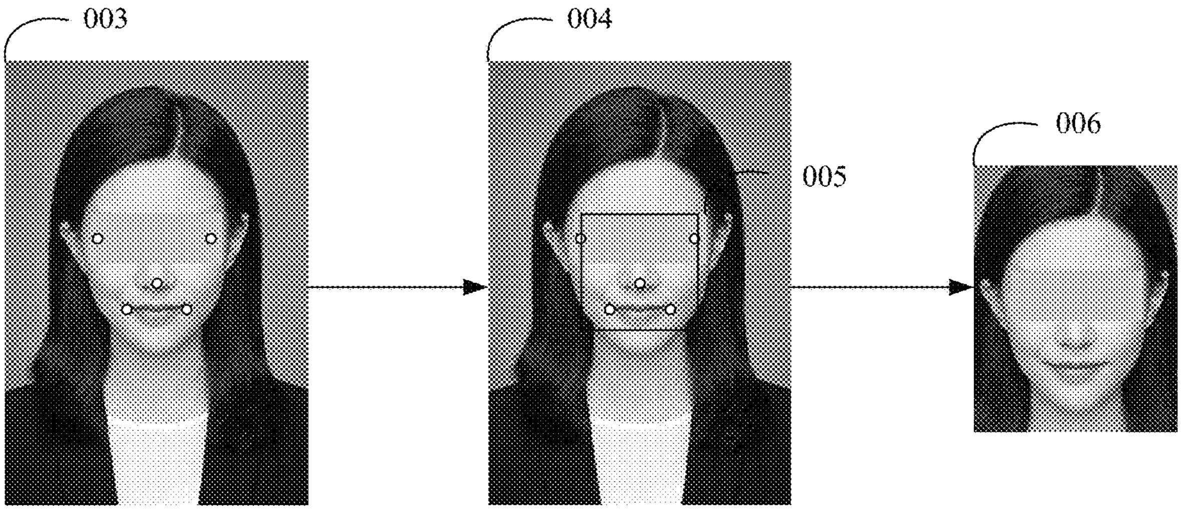
FIG. 5 is a schematic diagram of a scenario of facial detection according to an embodiment of this application.

Next, the facial image may be generated based on the location of the target facial key point. For example, in response to that the target facial key points are key points corresponding to the left pupil, right pupil, nose tip, left mouth corner, and right mouth corner, a minimum circumscribed square may be determined based on the 5 facial key points, and the circumscribed square is expanded 2.1 times as the facial image required for liveness detection. For example, as shown in FIG. 5, key points corresponding to the left pupil, right pupil, nose tip, left mouth corner, and right mouth corner are filtered out from 003 in the figure as the target facial key points. Then, as shown in 004 in FIG. 5, a minimum circumscribed square 005 may be generated based on these target facial key points, and the circumscribed square is expanded 2.1 times as a facial image 006 required for liveness detection. In addition, the facial image may also be scaled to improve the convenience of liveness detection. For example, the facial image may be scaled to 112 pixels (px)*112 pixels.

Step 202: Extract an image feature from the facial image.

In an embodiment, after the facial image is acquired, the liveness detection apparatus may extract the image feature from the facial image.

The image feature includes information capable of indicating a feature of the facial image. For example, the image feature may indicate light reflection and refraction from the face in the facial image. As another example, the image feature may indicate a color feature or a grayscale feature of the face in the facial image.

In an embodiment, the image feature may be extracted from the facial image in multiple ways.

For example, the image feature may be extracted from the facial image by a method such as a visual geometry group, a residual network (ResNet) or GoogLeNet.

As another example, pixel information of the facial image may be extracted and processed to obtain the image feature. Specifically, the operation of "extracting an image feature from the facial image" may include:

pixel extraction is performed on the facial image to obtain pixel information of the facial image;

convolutional operation is performed on the pixel information to obtain convolutional information of the facial image;

the convolutional information is normalized to obtain normalized information of the facial image; and non-linear transformation is performed on the normalized information to obtain the image feature of the facial image.

In an embodiment, pixel extraction may be performed on the facial image in multiple ways to obtain the pixel information of the facial image. For example, the pixel information may be extracted from the facial image by using an open source computer vision library (openCV). As another example, the pixel information of the facial image may be extracted by the canvas technology. For example, after being acquired, the facial image may be drawn on canvas, and the pixel information of the facial image may be extracted through an interface of canvas. For example, the pixel information of the facial image may be acquired through an interface getImageData( ) of canvas.

In an embodiment, after the pixel information of the facial image is obtained, convolutional operation may be performed on the pixel information to obtain the convolutional information of the facial image. For example, convolutional operation may be performed on the pixel information by using a convolutional kernel with a pre-set size to obtain the convolutional information of the facial image. As another example, convolutional operation may be performed on the pixel information by using convolutional kernels with different sizes. Information of the facial image in different dimensions may be obtained by performing convolutional operation on the pixel information by using convolutional kernels with different sizes, so that the accuracy of the image feature is improved.

In an embodiment, after convolutional operation is performed on the pixel information, because convolutional information in different dimensions may be obtained, the convolution information is normalized to obtain the normalized information of the facial image. Normalization may be performed in multiple ways. For example, the convolutional information may be simply scaled to obtain the normalized information. As another example, mean subtraction may be performed on the convolutional information to obtain the normalized information. As another example, the convolutional information may be labeled and characterized, that is, all convolutional information is enabled to have zero mean and a unit variance. Normalization for data may improve the rate and accuracy of feature extraction for the facial image.

In an embodiment, in order to improve the accuracy of feature extraction for the facial image, non-linear transformation may be further performed on the normalized information to obtain the image feature of the facial image. For example, non-linear transformation may be performed on the normalized information by using a non-linear function, such as a sigmoid function, a tanh function or an ReLU function, to obtain the image feature of the facial image.

In an embodiment, an artificial intelligence model may be trained according to requirements to obtain a pre-set feature extraction model capable of realizing a feature extraction function. Then, the image feature may be extracted from the facial image by using the pre-set feature extraction model. Specifically, the operation of "extracting an image feature from the facial image" may include:

the image feature is extracted from the facial image by using the pre-set feature extraction model.

The pre-set feature extraction model may be a deep learning network. For example, the pre-set feature extraction model may be a network such as a convolutional neural network (CNN) or a deep residual network (ResNet). In addition, the pre-set feature extraction model may be self-adjusted and self-modified according to the actual space and time requirements.

In an embodiment, in order to accelerate convergence of a network and improve the performance of the network, a structure of the pre-set feature extraction model according to the embodiments of this application may include several residual blocks connected in series. Each residual block includes two groups of basic computing units. Each computing unit is composed of a convolutional layer, a normalization layer, and a non-linear activation function.

The convolutional layer may realize convolutional operation. Different features of the facial image may be extracted by convolution operation. For example, the convolutional layer may be conv2d, conv2d 1×1, or conv.

The normalization layer may normalize convolutional information generated by the convolutional layer, so that the distribution of input data is consistent. For example, the normalization layer may be a batch normalization (BN) layer, a layer normalization (LN) layer, an instance normalization (IN) layer or a group normalization (GN) layer.

The non-linear activation function may perform non-linear mapping on normalized information outputted by the normalization layer, so that the function of the pre-set feature extraction model to fit the law of training data is improved. For example, the non-linear activation function may include a sigmoid function, a tanh function, and an ReLU function.

Step 203: Respectively perform liveness feature mapping on the plurality of reference features to obtain a plurality of corresponding reference liveness features.

In an embodiment, in the existing liveness detection method, a liveness feature is usually generated by using a training set. However, the training set is limited by data itself, so the liveness feature generated based on the training set cannot respond to all types of attacks. Therefore, in this embodiment, liveness mapping is performed on the plurality of reference features, and the plurality of reference liveness features are generated based on the feature distribution rather than training data.

The reference liveness feature is a reference for determining whether the to-be-detected object corresponding to the image feature is a live person. That is, liveness discrimination may be performed on the image feature based on the reference liveness features, so that whether the to-be-detected object corresponding to the image feature is a live person may be determined.

In an embodiment, a pre-set feature generation model capable of converting the reference feature into a reference liveness feature may be trained in advance, and then liveness feature mapping is performed on the reference feature by using the pre-set feature generation model to obtain the reference liveness feature. Specifically, the operation of "respectively performing liveness feature mapping on the plurality of reference features to obtain a plurality of corresponding reference liveness features" may include:

liveness feature mapping is performed on the plurality of reference features respectively by using the pre-set feature generation model to obtain the plurality of corresponding reference liveness features. For example, N Gaussian random vectors are inputted into the pre-set feature generation model, and N reference liveness features may be outputted. N is greater than or equal to 1. These reference liveness features may represent features of a real person, and jointly constitute a distribution of image features representing the real person.

The pre-set feature generation model may be a deep learning network. For example, the pre-set feature generation model may be composed of a multi-layer perceptron (MLP). In response to that the pre-set feature generation network is composed of an MLP, the MLP may include two fully connected layers. The fully connected layer may be used for classification. The computing efficiency of the pre-set feature generation model may be ensured through the two fully connected layers.

In an embodiment, a pre-set liveness feature space may be generated in advance, and then the reference features are mapped into the pre-set liveness feature space to obtain the reference liveness features. Specifically, the operation of "respectively performing liveness feature mapping on the plurality of reference features to obtain a plurality of corresponding reference liveness features" may include:

full connection is performed on the plurality of reference features to obtain fully connected information corresponding to the plurality of reference features;

the plurality of reference features are classified based on the fully connected information to obtain classification results corresponding to the plurality of reference features; and the plurality of reference features are mapped into the pre-set liveness feature space based on the classification results to obtain the plurality of reference liveness features.

Full connection may refer to forward processing for the reference feature without directional feedback. For example, full connection includes a plurality of mathematical operations, and these mathematical operations each have a corresponding operation sequence. When performing full connection on the reference features, the liveness detection apparatus will perform full connection on the reference features according to the corresponding operation sequences of these mathematical operations to obtain the fully connected information.

For example, full connection includes a plurality of linear operations and a plurality of non-linear operations. In accordance with provisions of full connection, after the linear operations are completed, the non-linear operations are performed. Therefore, when performing full connection on the reference features, the liveness detection apparatus will perform the linear operations on the reference features and then perform the non-linear operations.

In an embodiment, the reference features may be classified based on the fully connected information to obtain the classification results corresponding to the reference features. Classification for the reference features may refer to processing corresponding to categories of the reference features for the reference features, so that the reference features are closer to features of a live person. The reference features may be classified based on the fully connected information by using a pre-set classification function to obtain the classification results corresponding to the reference features. The classification function may be generated during analysis of liveness features.

In an embodiment, after the classification results are obtained, the reference features may be mapped into the pre-set liveness feature space based on the classification results, and values corresponding to the reference features in the pre-set liveness feature space are determined as the reference liveness features. The pre-set liveness feature space may be a liveness feature space generated by training.

The space indicates a correspondence between the reference feature and the reference liveness feature.

There is no limitation on the order of operation of step 202 and step 203. That is, step 202 may be first performed and then step 203 is performed, or step 203 may be first performed and then step 202 is performed. In addition, step 202 and step 203 may be performed in parallel.

Step 204: Perform liveness discrimination on the image feature based on the plurality of reference liveness features to obtain a discrimination result of the image feature.

In an embodiment, after the reference liveness features are obtained, liveness discrimination may be performed on the image feature based on the plurality of reference liveness features to obtain the discrimination result of the image feature. Specifically, the operation of "performing, based on the plurality of reference liveness features, liveness discrimination on the image feature to obtain a discrimination result of the image feature" may include:

- perform similarity calculation on the plurality of reference liveness features and the image feature are calculated to obtain a feature similarity between each reference liveness feature and the image feature;
- index conversion is performed on the feature similarity based on a pre-set liveness discrimination criterion to obtain a target index corresponding to the feature similarity; and
- the target index is compared with a pre-set discrimination index to obtain the discrimination result.

In an embodiment, the reference liveness feature provides a reference for a feature of a facial image of a real live person, that is, the feature of the facial image of the real live person shall be very similar to the reference liveness feature. Therefore, similarity calculation may be performed on the plurality of reference liveness features and the image feature to obtain the feature similarity between each reference liveness feature and the image feature.

The feature similarity between the reference liveness feature and the image feature may be calculated in multiple ways. For example, a cosine distance, a Euclidean distance or a Hamming distance between the image feature and the reference liveness feature may be calculated, and the calculated distance is taken as the feature similarity.

In an embodiment, the feature similarities between the plurality of reference liveness features and the image feature may be calculated, and index conversion may be performed on the feature similarities based on the pre-set liveness discrimination criterion to obtain the target indexes corresponding to the feature similarities. Index conversion may refer to conversion of the feature similarities between the plurality of reference liveness features and the image feature to the same standard dimension, so that whether the to-be-detected object is a live person may be determined in the same standard dimension.

The pre-set liveness discrimination criterion may be a criterion that is set in advance for determining whether the to-be-detected object is a live person. For example, the pre-set liveness discrimination criterion may specify how to perform index conversion on the feature similarity and how to determine whether the to-be-detected object is a live person. For example, the pre-set liveness discrimination criterion may specify that an index conversion method for the feature similarity is calculation of a mean and a variance of a plurality of feature similarities. As another example, the pre-set liveness discrimination criterion may specify that the index conversion method for the feature similarity is normalization for the feature similarity.

For example, the pre-set liveness discrimination criterion may specify that the index conversion method for the feature similarity is calculation of a mean and a variance of a plurality of feature similarities. It is assumed that there are N reference liveness features. Cosine distances between the image feature and the N reference liveness features may be calculated to obtain a cosine distance 1, a cosine distance 2, . . . , and a cosine distance N. A mean and a variance of these cosine distances may be calculated, and the calculated mean and variance are taken as the target indexes.

In an embodiment, after the target index corresponding to the feature similarity is obtained, the target index may be compared with the pre-set discrimination index to obtain the discrimination result.

The pre-set discrimination index may be a condition that is set in the pre-set liveness discrimination criterion in advance and used for determining the target index. For example, in response to that the target indexes are a mean and a variance of the feature similarities, the pre-set discrimination indexes may be a pre-set discrimination mean and a pre-set discrimination variance. For example, the pre-set discrimination mean may be a, and the pre-set discrimination variance may be b. In response to that the mean of the feature similarities is greater than a, and the variance of the feature similarities is less than b, it is determined that the to-be-detected object is a live person; otherwise, it is determined that the to-be-detected object is an attack.

In an embodiment, a pre-set discrimination module may be generated, and the image feature is discriminated by using the pre-set discrimination module to obtain the discrimination result of the image feature. Specifically, the operation of "performing, based on the plurality of reference liveness features, liveness discrimination on the image feature to obtain a discrimination result of the image feature" may include:

- liveness discrimination is performed on the image feature based on the plurality of reference liveness features by using the pre-set discrimination module to obtain the discrimination result of the image feature.

The pre-set discrimination module may possess a function of performing liveness discrimination on the image feature. For example, the reference liveness features and the image feature may be inputted into the pre-set discrimination module, and the pre-set discrimination module may output the discrimination result of liveness discrimination for the image feature.

The pre-set discrimination module may perform the foregoing operations. That is, the pre-set discrimination module may perform the operations of "performing similarity calculation on the plurality of reference liveness features and the image feature to obtain a feature similarity between each reference liveness feature and the image feature; performing, based on a pre-set liveness discrimination criterion, index conversion on the feature similarity to obtain a target index corresponding to the feature similarity; and comparing the target index with a pre-set discrimination index to obtain the discrimination result".

Step 205: Perform distribution fitting on the plurality of reference features based on the image feature to obtain a distribution fitting result for the image feature.

In an embodiment, whether the to-be-detected object is a live person may be determined from two perspectives. One perspective is the perspective of the feature similarity, that is, liveness discrimination is performed on the image feature based on the plurality of reference liveness features to obtain the discrimination result of the image feature. The other perspective is the perspective of a distribution similarity, that is, distribution fitting is performed on the plurality of reference features based on the image feature to obtain the distribution fitting result for the image feature.

In an embodiment, because the reference features conform to the target feature distribution, the image feature may be taken as a target for liveness feature mapping for the reference features. That is, the reference features may be processed to find out an optimal "pre-mapping feature" of the image feature, and whether the "pre-mapping feature" conforms to the target feature distribution is determined. In response to that the "pre-mapping feature" conforms to the target feature distribution, it indicates that the to-be-detected object corresponding to the image feature is a live person, otherwise, the to-be-detected object is an attack. In conclusion, distribution fitting for the reference features is processing for the reference feature, which makes the distribution of the reference features similar to that of the "pre-mapping feature" of the image feature.

In an embodiment, gradient operation may be performed on the reference features, and the reference features are continuously fitted with the "pre-mapping feature" of the image feature through the gradient operation. The operation of "performing, based on the image feature, distribution fitting on the plurality of reference features to obtain a distribution fitting result for the image feature" may specifically include:

gradient operation is performed on the plurality of reference features to obtain gradient information of each reference feature;

the gradient information of each reference feature is converged based on the image feature to obtain converged information of each reference feature; and the distribution fitting result is determined based on the converged information of each reference feature.

Gradient operation may be performed on the plurality of reference features in multiple ways to obtain the gradient information of each reference feature. For example, gradient operation may be performed on the plurality of reference features respectively by using a gradient algorithm, such as stochastic gradient descent (SGD), batch gradient descent (BGD) or mini-batch gradient descent (MGD), to obtain the gradient information of each reference feature.

In an embodiment, in order to fit the reference features with the "pre-mapping feature" of the image feature, the gradient information of each reference feature may be converged based on the image feature to obtain the converged information of each reference feature. Converging the gradient information of each reference feature based on the image feature may refer to that gradient operation is continuously performed on the reference features by taking the image feature as a target to converge the gradient information of the reference features.

For example, after gradient operation is performed on the reference feature to obtain the gradient information of the reference feature, liveness mapping may be performed on the gradient information of the reference feature to obtain a liveness feature corresponding to the gradient information. Loss information of the liveness feature corresponding to the gradient information and the image feature may be calculated. Gradient operation may be performed on the reference feature for the second time based on the loss information of the liveness feature and the image feature to obtain gradient information of the reference feature that is obtained by the second gradient operation. Liveness mapping is performed on the gradient information of the reference feature that is obtained by the second gradient operation to obtain a liveness feature corresponding to the second gradient information. Loss information of the liveness feature corresponding to the second gradient information and the image feature may be calculated. The foregoing process may be repeated continuously until the loss information of the liveness feature corresponding to the gradient information and the image feature is converged. When the loss information of the liveness feature corresponding to the gradient information and the image feature is converged, the gradient information of the reference feature also reaches a converged state. At this moment, the converged information of the reference feature may be obtained. The converged information of the reference feature may be equivalent to the "pre-mapping feature" of the image feature.

Next, the distribution fitting result may be determined based on the converged information of each reference feature. Specifically, the operation of "determining the distribution fitting result based on the converged information of each reference feature" may include:

distribution analysis is performed on the image feature based on the converged information of each reference feature to obtain an image feature distribution of the image feature;

a distribution similarity between the image feature distribution and the pre-set feature distribution is calculated; and the distribution similarity is compared with a pre-set distribution discrimination condition to obtain the distribution fitting result.

The image feature distribution is a feature distribution of a plurality of corresponding features that is obtained by reversely mapping the image feature into the pre-set liveness feature space used for liveness feature mapping for the plurality of reference features. Because the plurality of reference liveness features are generated through the pre-set liveness feature space, the plurality of corresponding features, that is, the foregoing "pre-mapping features" of the image feature, may also be obtained by reversely mapping the image feature. The feature distribution of the plurality of pre-mapping features is the image feature distribution of the image feature. The image feature distribution of the image feature may include information used for indicating a probability distribution to which the image feature conforms. For example, in response to that the image feature distribution is a standard normal distribution, it indicates that the image feature conforms to the standard normal distribution. As another example, in response to that the image feature distribution is a binomial distribution, it indicates that the image feature conforms to the binomial distribution.

In an embodiment, distribution analysis is performed on the image feature, that is, the probability distribution to which the image feature conforms is analyzed. For example, the converged information of each reference feature may be converted into a histogram, and the histogram is analyzed to obtain the image feature distribution of the image feature.

In an embodiment, after the image feature distribution is obtained, the distribution similarity between the image feature distribution and the pre-set feature distribution may be calculated. If the distribution similarity between the image feature distribution and the pre-set feature distribution is high, it indicates that the to-be-detected object is a live person, otherwise, it indicates that the to-be-detected object is an attack.

The distribution similarity between the image feature distribution and the pre-set feature distribution may be determined by an image method. Generally, in response to that the image feature distribution and the pre-set feature distribution are the same type of distribution, images corresponding to the feature distributions are very similar to each other, and the distribution similarity is high. On the contrary, in response to that the image feature distribution and the pre-set feature distribution are not the same type of distribution, images corresponding to the feature distributions are greatly different from each other, and the distribution similarity is low.

In an embodiment, after the converged information is obtained, a Kullback-Leibler (KL) divergence between the converged information and the reference feature may be calculated, and whether the to-be-detected object is a live person is determined based on the KL divergence. For example, in response to that the KL divergence is less than a threshold c, it may be determined that the to-be-detected object is a real person, otherwise, it may be determined that the to-be-detected object is an attack.

In an embodiment, a pre-set distribution fitting module may be generated, and distribution fitting is performed on the plurality of reference features based on the image feature by using the pre-set distribution fitting module to obtain the distribution fitting result for the image feature. Specifically, the operation of "performing, based on the image feature, distribution fitting on the plurality of reference features to obtain a distribution fitting result for the image feature" may include:

distribution fitting is performed on the plurality of reference features based on the image feature by using the pre-set distribution fitting module to obtain the distribution fitting result for the image feature.

The pre-set distribution fitting module may possess a function of performing distribution fitting on the reference features based on the image feature. For example, the image feature and the reference features may be inputted into the pre-set distribution fitting module, and then the pre-set distribution fitting module may output the distribution fitting result for the image feature.

The pre-set distribution fitting module may perform the foregoing operations. For example, the pre-set distribution fitting module may perform the operations of "performing distribution analysis on the image feature based on the converged information of each reference feature to obtain an image feature distribution of the image feature; calculating a distribution similarity between the image feature distribution and the pre-set feature distribution; and comparing the distribution similarity with a pre-set distribution discrimination condition to obtain the distribution fitting result". In addition, the pre-set distribution fitting module may further perform the process of "calculating a Kullback-Leibler (KL) divergence between the converged information and the reference feature, and determining whether the to-be-detected object is a live person based on the KL divergence". For example, in response to that the KL divergence is less than a threshold c, the pre-set distribution fitting module may determine that the to-be-detected object is a real person, otherwise, the pre-set distribution fitting module may determine that the to-be-detected object is an attack.

Step 206: Perform liveness detection on the to-be-detected object based on the discrimination result and the distribution fitting result.

In an embodiment, after the discrimination result and the distribution fitting result are obtained, liveness detection may be performed on the to-be-detected object based on the discrimination result and the distribution fitting result, that is, whether the to-be-detected object is a live person is determined with reference to the discrimination result and the distribution fitting result.

For example, in response to that both the pre-set discrimination module and the pre-set distribution fitting module determine that the to-be-detected object is not a live person but an attack, the terminal may consider the to-be-detected object to be an attack and output a liveness detection result showing that liveness detection fails.

As another example, in response to that the pre-set discrimination module or the pre-set distribution fitting module determines that the to-be-detected object is not a live person but an attack, for security, the terminal may re-collect a facial image of the to-be-detected object and detect the facial image of the to-be-detected object again. In response to that the pre-set discrimination module or the pre-set distribution fitting module still determines that the to-be-detected object is not a live person, the terminal may consider the to-be-detected object to be an attack and output a liveness detection result showing that liveness detection fails.

As another example, in response to that both the pre-set discrimination module and the pre-set distribution fitting module determine that the to-be-detected object is a live person, the terminal may consider the to-be-detected object to be a live person and output a liveness detection result showing that liveness detection succeeds.

Figure 6:
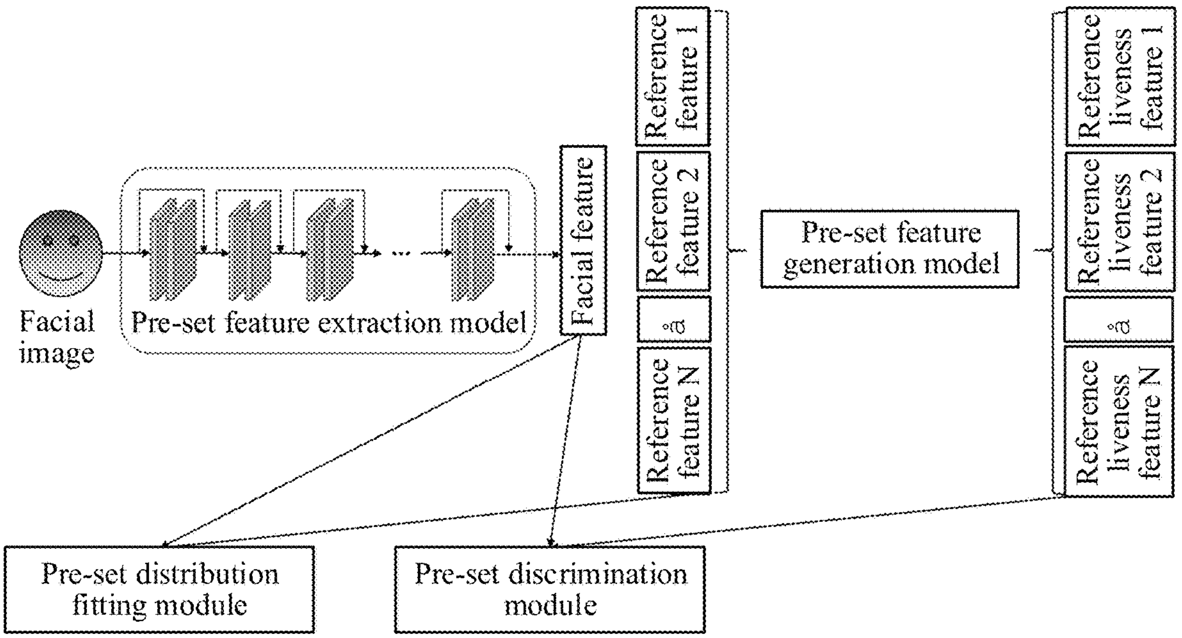
FIG. 6 is a schematic diagram of another scenario of a liveness detection method according to an embodiment of this application.

In an embodiment, in order to better represent the liveness detection method according to the embodiments of this application, this application provides a model structure for the liveness detection method, for example, as shown in FIG. 6. As shown in FIG. 6, in order to avoid the problem of an uncertain prediction result for a non-homogeneous dataset, an embodiment of this application proposes a liveness detection method based on feature generation and hypothesis testing. A processing framework of the method mainly includes a pre-set feature extraction model, a pre-set feature generation model, a pre-set discrimination module, and a pre-set distribution fitting module. Hypothesis testing, also referred to as statistical hypothesis testing, is a statistical inference method used for determining whether a difference between samples or between a sample and a population is caused by a sampling error or an essential difference.

The pre-set feature extraction model is configured to extract an image feature from a facial image. The pre-set feature generation model is configured to respectively perform liveness feature mapping on a plurality of reference features to obtain a plurality of corresponding reference liveness features. Hypothesis testing will be performed on the image feature in two dimensions.

In the one hand, liveness discrimination is performed on the image feature based on the plurality of reference liveness features by using the pre-set discrimination module to obtain a discrimination result of the image feature. The pre-set discrimination module is mainly configured to determine uncertainty of the liveness detection process. From the perspective of uncertainty estimation, in response to that a distribution of input data is different from that of a training set, a feature vector obtained by the conventional feature extraction network is highly uncertain, and a prediction result for the data is often uncertain. On the contrary, the reference liveness feature generated based on the reference feature conforming to the same pre-set feature distribution is highly certain, and the accuracy and certainty of testing whether the image feature conforms to the same distribution by taking the reference liveness feature as a hypothesis are higher.

In the other hand, distribution fitting is performed on the plurality of reference features based on the image feature by using the pre-set distribution fitting module to obtain a distribution fitting result for the image feature. In the embodiments of this application, the purpose of using the reference features conforming to the pre-set feature distribution is to fit a distribution of a live person based on the distribution rather than data. Therefore, the pre-set distribution fitting module is mainly configured to compare a "pre-mapping feature" of the image feature with the pre-set feature distribution. A to-be-detected object whose image feature does not conform to the pre-set feature distribution may be considered to be an attack. Compared with the related art, the method according to the embodiments of this application achieves a better defense effect on unknown types of attacks, so that the accuracy and reliability of liveness detection are improved.

In an embodiment, before the feature of the facial image is extracted by using the pre-set feature extraction model and liveness feature mapping is performed on the plurality of reference features by using the pre-set feature generation model, a model needs to be trained to obtain the pre-set feature extraction model.

Specifically, the method according to the embodiments of this application may further include:

a to-be-trained feature extraction model and a to-be-trained feature generation model are acquired;

a plurality of facial image training samples and a reference feature sample set that includes reference feature samples conforming to the pre-set feature distribution, and the reference feature sample set includes a plurality of reference feature training samples; and the to-be-trained feature extraction model and the to-be-trained feature generation model are trained by using the plurality of facial image training samples and the plurality of reference feature training samples to obtain the pre-set feature extraction model and the pre-set feature generation model.

The to-be-trained feature extraction model is also referred to as a "target feature extraction model, and may include a model that needs to be trained and whose performance does not meet the requirements. The to-be-trained feature generation model is also referred to as a "target feature generation model," and may include a model that needs to be trained and whose performance does not meet the requirements.

The to-be-trained feature generation model and the to-be-trained feature extraction model may be deep learning models. For example, the to-be-trained feature generation model may be a model composed of an MLP. For example, a structure of the to-be-trained feature extraction model may include several residual blocks connected in series. Each residual block includes two groups of basic computing units. Each computing unit is composed of a convolutional layer, a normalization layer, and a non-linear activation function.

In an embodiment, before the to-be-trained feature extraction model and the to-be-trained feature generation model are trained, the plurality of facial image training samples and the reference feature sample set that includes reference feature samples conforming to the pre-set feature distribution may be collected. The reference feature sample set includes the plurality of reference feature training samples.

The facial image training sample refers to data used for training for the model. The facial image training sample may include a positive sample and a negative sample. The positive sample may include a facial image sample of a live person, and the negative sample may include a facial image sample of an attack. For example, N1 real person pictures, N2 paper-printed attack pictures, N3 screen-remade attack pictures, and N4 3D masks may be collected. The real person pictures may be positive samples, and the paper-printed attack pictures, the screen-remade attack pictures, and the 3D masks may be negative samples.

The reference feature training sample may include data used for training for the model. For example, M pieces of data may be randomly sampled from data conforming to the pre-set feature distribution as the reference feature training samples.

Next, the to-be-trained feature extraction model and the to-be-trained feature generation model may be trained by using the plurality of facial image training samples and the plurality of reference feature training samples to obtain the pre-set feature extraction model and the pre-set feature generation model.

In an embodiment, the operation of "training the to-be-trained feature extraction model and the to-be-trained feature generation model by using the plurality of facial image training samples and the plurality of reference feature training samples to obtain the pre-set feature extraction model and the pre-set feature generation model" may include:

image sample features are extracted from the facial image training samples by using the to-be-trained feature extraction model;

liveness feature mapping is performed on the plurality of reference feature training samples by using the to-be-trained feature generation model to obtain a plurality of sample liveness features;

feature loss information and distribution loss information corresponding to the image sample features are calculated based on the plurality of sample liveness features and the plurality of reference feature training samples; and parameters of the to-be-trained feature extraction model are adjusted based on the feature loss information to obtain the pre-set feature extraction model, and parameters of the to-be-trained feature generation model are adjusted based on the distribution loss information to obtain the pre-set feature generation model.

In an embodiment, the operation of "extracting image sample features from the facial image training samples by using the to-be-trained feature extraction model" may refer to step 202. Details are not described herein again.

In an embodiment, the operation of "performing liveness feature mapping on the plurality of reference feature training samples by using the to-be-trained feature generation model to obtain a plurality of sample liveness features" may refer to step 203. Details are not described herein again.

In an embodiment, when the to-be-trained feature generation model and the to-be-trained feature extraction model are trained, the pre-set discrimination module and the pre-set distribution fitting module may be used to assist in training. For example, in the operation of "calculating feature loss information and distribution loss information corresponding to the image sample features based on the plurality of sample liveness features and the plurality of reference feature training samples," the pre-set discrimination module and the pre-set distribution fitting module may be introduced to calculate the loss information. Specifically, the operation of "calculating feature loss information and distribution loss information corresponding to the image sample features based on the plurality of sample liveness features and the plurality of reference feature training samples" may include:

the feature loss information of the image sample features and the plurality of sample liveness features is calculated by using the pre-set discrimination module; and the distribution loss information of the image sample features and the plurality of reference feature training samples is calculated by using the pre-set distribution fitting module.

For example, feature similarities between the image sample features and the plurality of sample liveness features may be calculated by using the pre-set discrimination module and taken as the feature loss information. For example, cosine distances between the image sample features and M sample liveness features may be calculated. Then, a mean and a variance of the M cosine distances are calculated and taken as the feature loss information.

For example, gradient information of the image sample features relative to the reference feature training samples may be calculated by using the pre-set distribution fitting module and taken as the distribution loss information. For example, derivatives of the image sample features relative to the reference feature training samples may be calculated and taken as the distribution loss information.

In an embodiment, after the feature loss information and the distribution loss information are obtained, the parameters of the to-be-trained feature extraction model may be adjusted based on the feature loss information to obtain the pre-set feature extraction model, and the parameters of the to-be-trained feature generation model may be adjusted based on the distribution loss information to obtain the pre-set feature generation model.

For example, in response to that the feature loss information is the feature similarities between the image sample features and the plurality of sample liveness features, the parameters of the to-be-trained feature extraction model may be adjusted based on the principle that feature similarities between image sample information of a positive sample and the plurality of sample liveness features are as high as possible and feature similarities between image sample information of a negative sample and the plurality of sample liveness features are as low as possible, to obtain the pre-set feature extraction model. For example, in response to that the loss information is a mean and a variance of M cosine distances, when the parameters of the to-be-trained feature extraction model are adjusted, a direction of adjustment may be that for a positive sample, the mean of the M cosine distances is constrained to be as large as possible and the variance is constrained to be as small as possible. For a negative sample, the mean of the M cosine distances may be constrained to be as small as possible and the variance may be constrained to be as large as possible.

As another example, in response to that the distribution loss information is derivatives of the image sample features relative to the reference feature training samples, the parameters of the to-be-trained feature generation model may be adjusted based on the principle that a norm of a derivative of a positive sample is as small as possible and a norm of a derivative of a negative sample is as large as possible. The norm may include multiple types of norms. For example, the norm may include an L1 norm, an L2 norm, and an L-infinity norm.

The method according to the embodiments of this application is applicable to a plurality of application scenarios. For example, the method is applicable to a payment scenario, an access control scenario, and an information query scenario. Due to the emphasis on real-time performance in the payment and access control scenarios, a quantity of model parameters may be reduced by a method, such as model distillation or pruning, to reduce model operation time and improve the efficiency of liveness detection.

In the embodiments of this application, the image feature of the facial image will be verified from two aspects to determine whether the to-be-detected object is a live person. In a first aspect, liveness discrimination is performed on the image feature based on the plurality of reference liveness features to obtain the discrimination result of the image feature. In this aspect, uncertainty of the liveness detection process is mainly determined. Because the reference liveness feature is generated based on the reference feature conforming to the pre-set feature distribution, the accuracy and certainty of testing whether the image feature conforms to the same distribution by taking the reference liveness feature as a hypothesis are higher. Accordingly, the accuracy and reliability of the liveness detection process will be higher.

In a second aspect, distribution fitting is performed on the plurality of reference features based on the image feature to obtain the distribution fitting result for the image feature. The purpose of using the reference features conforming to the pre-set feature distribution is to fit a distribution of a live person based on the distribution rather than data. Therefore, the pre-set distribution fitting module is mainly configured to compare a "pre-mapping feature" of the image feature with the pre-set feature distribution. A to-be-detected object whose image feature does not conform to the pre-set feature distribution may be considered to be an attack. Compared with the related art, the method according to the embodiments of this application achieves a better defense effect on unknown types of attacks, so that the accuracy and reliability of liveness detection are improved.

According to the method described in the foregoing embodiments, the following further provides detailed descriptions by using an example.

In the embodiments of this application, the method according to the embodiments of this application is described by using an example in which the liveness detection method is integrated into a terminal.

Figure 7:
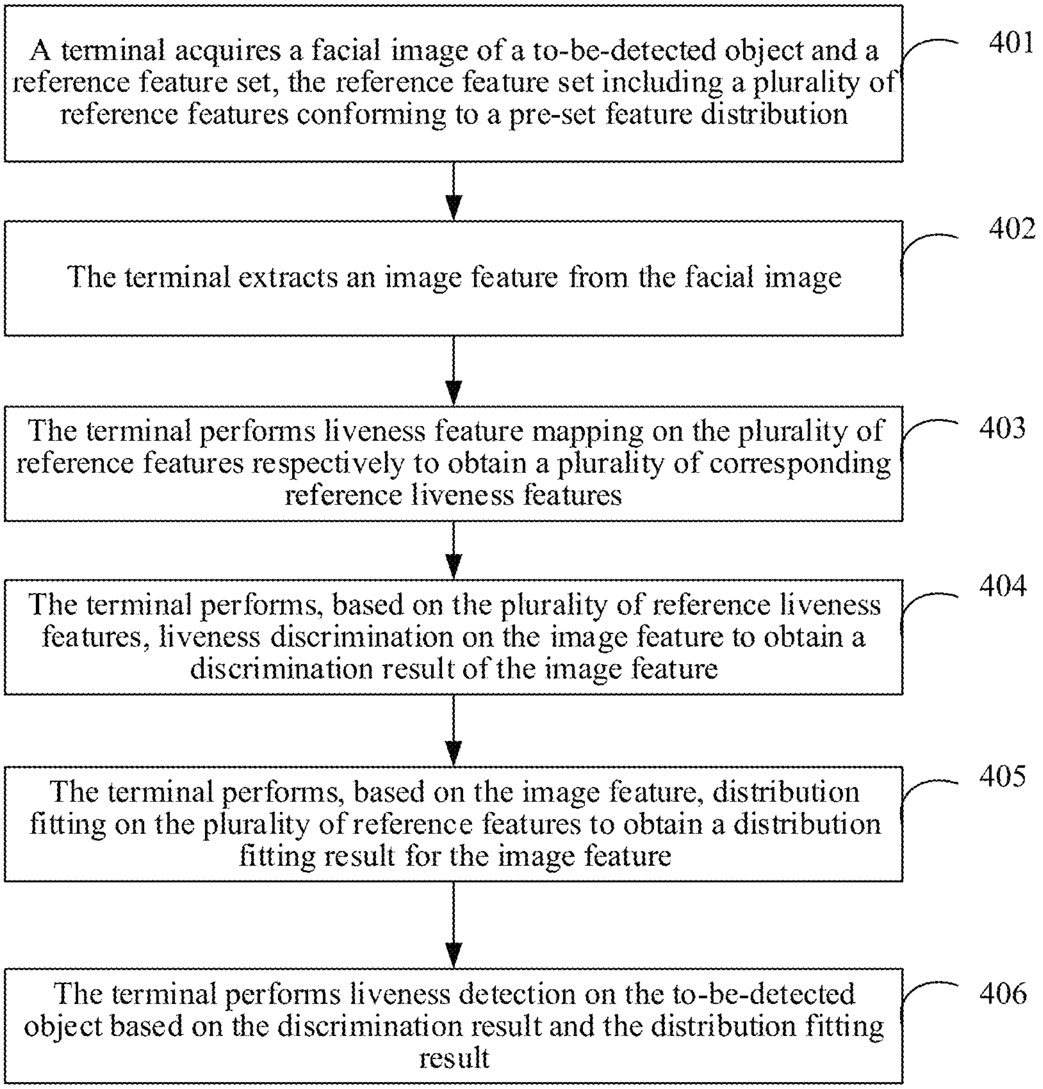
FIG. 7 is another schematic flowchart of a liveness detection method according to an embodiment of this application.

In an embodiment, as shown in FIG. 7, a liveness detection method is provided. Specific procedures are as follows.

Step 401: A terminal acquires a facial image of a to-be-detected object and a reference feature set, the reference feature set including a plurality of reference features conforming to a pre-set feature distribution.

In an embodiment, in order to solve the problem in the related art, the embodiment of this application provides a liveness detection method based on feature generation and hypothesis testing. A framework of the method may be shown in FIG. 6. Steps of the method are performed by a pre-set feature extraction model, a pre-set feature generation model, a pre-set discrimination module, and a pre-set distribution fitting module.

For example, when receiving a liveness detection trigger instruction triggered by the to-be-detected object, the terminal may start a camera to collect a to-be-detected video. Then, the terminal may convert the to-be-detected video into a to-be-detected image, and perform facial detection on the to-be-detected image. In response to that the terminal detects the presence of a face in the to-be-detected image, the terminal starts the subsequent recognition process, otherwise, the terminal directly determines that facial liveness detection fails.

Figure 8:
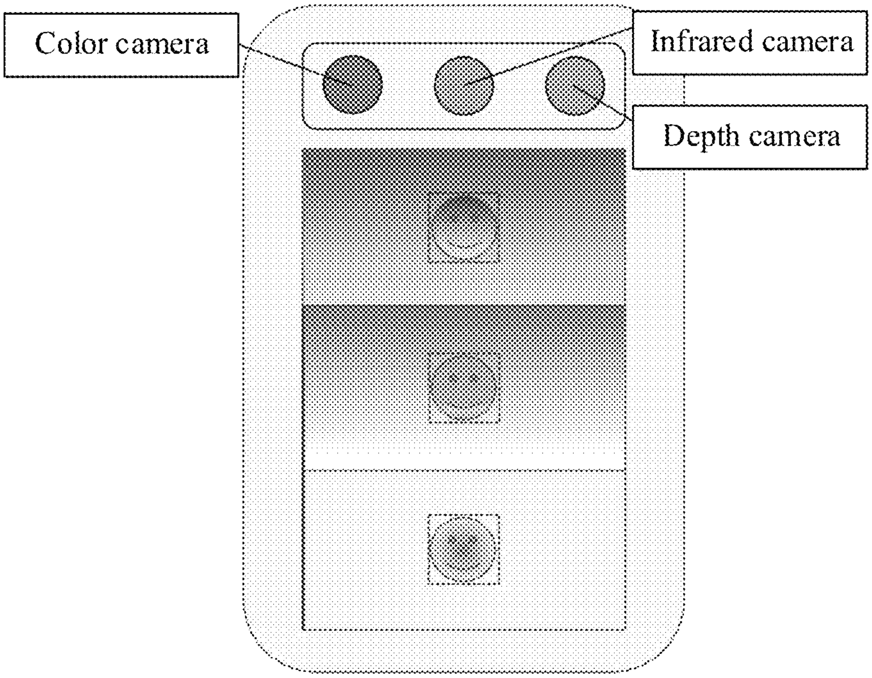
FIG. 8 is a schematic diagram of a scenario of a terminal according to an embodiment of this application.

For example, FIG. 8 is a schematic diagram of an intelligent terminal with a trinocular camera. The trinocular camera includes a color camera, an infrared camera, and a depth camera. The color camera captures an image in a visible light band, the infrared camera captures an image in a specific infrared band, and the depth camera captures depth information of a scene ahead.

The method framework according to the embodiments of this application does not depend on a specific type of camera, but is applicable to any camera.

In an embodiment, in response to that the terminal detects the presence of a face in the to-be-detected image, the terminal may determine the facial image from at least one to-be-detected image.

In an embodiment, the terminal may randomly sample Gaussian vectors conforming to a standard normal distribution (also referred to as a Gaussian distribution) to obtain several Gaussian vectors, and take the Gaussian vectors obtained by sampling as the reference features. The reference features obtained by sampling may constitute a set, which is referred to as a reference feature set.

For example, several vectors may be obtained by sampling multi-dimensional vectors conforming to the standard normal distribution, and the vectors obtained by sampling are taken as the reference features. For example, there are 100 Gaussian vectors conforming to the standard normal distribution, and 50 vectors may be obtained by sampling the 100 Gaussian vectors and taken as the reference features. Sampling may be performed in multiple ways. For example, the reference features may be obtained by random sampling.

402: The terminal extracts an image feature from the facial image.

For example, the terminal may input the facial image into a trained pre-set feature extraction model to obtain the image feature of the facial image.

The pre-set feature extraction model may be a deep convolutional network, such as a visual geometry group (VGG), a residual network (ResNet) or GoogLeNet. In addition, the pre-set feature extraction model may be self-adjusted and self-modified according to the actual space and time requirements.

403: The terminal performs liveness feature mapping on the plurality of reference features respectively to obtain a plurality of corresponding reference liveness features.

For example, the terminal may perform liveness feature mapping on the plurality of reference features respectively by using a pre-set feature generation model to obtain the plurality of corresponding reference liveness features.

404: The terminal performs, based on the plurality of reference liveness features, liveness discrimination on the image feature to obtain a discrimination result of the image feature.

For example, the terminal may perform, based on the plurality of reference liveness features, liveness discrimination on the image feature by using a pre-set discrimination module to obtain the discrimination result of the image feature.

The pre-set discrimination module is configured to compare differences between the reference liveness features and the image feature to determine whether the to-be-detected object is a live person.

In an embodiment, the differences between the reference liveness features and the image feature may be compared in multiple ways.

For example, cosine distances, Euclidean distances or Hamming distances between the reference liveness features and the image feature may be calculated.

For example, there are N reference liveness features. Cosine distances between the image feature and the N reference liveness features may be calculated to obtain a cosine distance 1, a cosine distance 2, . . . , and a cosine distance N. A mean of these cosine distances may be calculated. If the mean of these cosine distances trends to 1, it indicates that the to-be-detected object corresponding to the image feature is more likely to be a real person. If the mean of these cosine distance trends to −1, it indicates that the to-be-detected object corresponding to the image feature is more likely not a live person but an attack.

In addition, the inaccuracy of the image feature may further be measured by calculating a variance of these cosine distances. If the variance of these cosine distances is small, it indicates that the prediction of the pre-set discrimination module for the image feature is more certain. On the contrary, it indicates that the change of the prediction of the pre-set discrimination module for the image feature is large and the uncertainty is high, and the to-be-detected object corresponding to the image feature is more likely not a live person but an unknown type of attack.

In an embodiment, the plurality of reference liveness features and the image feature are inputted into the pre-set discrimination module to obtain a mean and a variance of the differences (cosine distances or Euclidean distances) between the image feature and the reference liveness features. If the mean is greater than a threshold a and the variance is less than a threshold b, it is determined that the to-be-detected object is a live person, otherwise, it is determined that the to-be-detected object is an attack.

405: The terminal performs, based on the image feature, distribution fitting on the plurality of reference features to obtain a distribution fitting result for the image feature.

For example, the terminal may perform, based on the image feature, distribution fitting on the plurality of reference features by using a pre-set distribution fitting module to obtain the distribution fitting result for the image feature.

Inputs of the pre-set distribution fitting module may be the image feature and the plurality of reference features obtained by sampling. Under the condition that network parameters of the pre-set feature generation model are unchanged, the pre-set feature generation model is enabled to take the image feature as a target output.

For example, the pre-set distribution fitting model may perform gradient descent optimization on the plurality of inputted reference features to find out "optimal input vectors" of the image feature. That is, derivatives of the reference features may be taken to obtain derived reference features. Then, the derived reference features are inputted into the pre-set feature generation model to obtain liveness features generated based on the derived reference features. Next, loss information of the liveness features generated based on the derived reference features and the image feature may be calculated, and derivatives of the reference features may be taken again based on the loss information. By continuously repeating the foregoing process, the plurality of reference features are finally converged to the "optimal input vectors" of the image feature.

After a plurality of "optimal input vectors" of the image feature are obtained, a KL divergence between the plurality of optimal input vectors and the standard normal distribution may be calculated. If the KL divergence is less than a threshold c, it may be determined that the to-be-detected object is a live person, otherwise, it may be determined that the to-be-detected object is not a live person but an attack.

406: The terminal performs liveness detection on the to-be-detected object based on the discrimination result and the distribution fitting result.

For example, in response to that both the pre-set discrimination module and the pre-set distribution fitting module determine that the to-be-detected object is not a live person but an attack, the terminal may consider the to-be-detected object to be an attack and output a liveness detection result showing that liveness detection fails.

As another example, in response to that the pre-set discrimination module or the pre-set distribution fitting module determines that the to-be-detected object is not a live person but an attack, for security, the terminal may re-collect a facial image of the to-be-detected object and detect the facial image of the to-be-detected object again. In response to that the pre-set discrimination module or the pre-set distribution fitting module still determines that the to-be-detected object is not a live person, the terminal may consider the to-be-detected object to be an attack and output a liveness detection result showing that liveness detection fails.

As another example, in response to that both the pre-set discrimination module and the pre-set distribution fitting module determine that the to-be-detected object is a live person, the terminal may consider the to-be-detected object to be a live person and output a liveness detection result showing that liveness detection succeeds.

According to the embodiments of this application, the accuracy and reliability of liveness detection may be improved.

In order to better implement the liveness detection method according to the embodiments of this application, an embodiment further provides a liveness detection apparatus. The liveness detection apparatus may be integrated into a computer device. Nouns have meanings the same as those in the foregoing liveness detection method, and for specific implementation details, refer to the description in the method embodiments.

Figure 9:
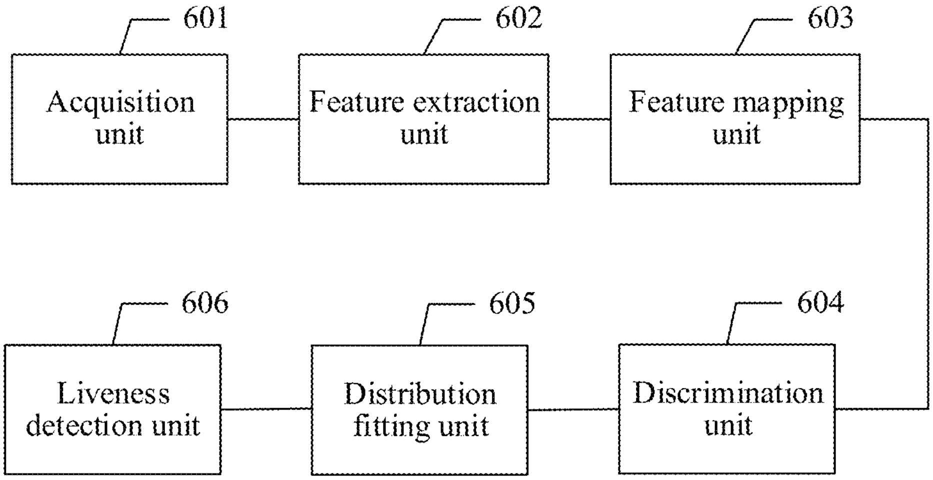
FIG. 9 is a schematic structural diagram of a liveness detection apparatus according to an embodiment of this application.

In an embodiment, a liveness detection apparatus is provided. The liveness detection apparatus may be specifically integrated into a computer device. As shown in FIG. 9, the liveness detection apparatus includes: an acquisition unit 601, a feature extraction unit 602, a feature mapping unit 603, a discrimination unit 604, a distribution fitting unit 605, and a liveness detection unit 606. Specifically,

- the acquisition unit 601 is configured to acquire a facial image of a to-be-detected object and a reference feature set, the reference feature set including a plurality of reference features conforming to a pre-set feature distribution;
- the feature extraction unit 602 is configured to extract an image feature from the facial image;
- the feature mapping unit 603 is configured to respectively perform liveness feature mapping on the plurality of reference features to obtain a plurality of corresponding reference liveness features;
- the discrimination unit 604 is configured to perform, based on the plurality of reference liveness features, liveness discrimination on the image feature to obtain a discrimination result of the image feature;
- the distribution fitting unit 605 is configured to perform, based on the image feature, distribution fitting on the plurality of reference features to obtain a distribution fitting result for the image feature; and
- the liveness detection unit 606 is configured to perform liveness detection on the to-be-detected object based on the discrimination result and the distribution fitting result.

In an embodiment, the distribution fitting unit 605 may include:

- a gradient operation sub-unit, configured to perform gradient operation on the plurality of reference features to obtain gradient information of each reference feature;
- a convergence sub-unit, configured to converge, based on the image feature, the gradient information of each reference feature to obtain converged information of each reference feature; and
- a result determination sub-unit, configured to determine the distribution fitting result based on the converged information of each reference feature.

In an embodiment, the result determination sub-unit may include:

- a distribution analysis module, configured to perform, based on the converged information of each reference feature, distribution analysis on the image feature to obtain an image feature distribution of the image feature;
- a similarity calculation module, configured to calculate a distribution similarity between the image feature distribution and the pre-set feature distribution; and
- a comparison module, configured to compare the distribution similarity with a pre-set distribution discrimination condition to obtain the distribution fitting result.

In an embodiment, the discrimination unit 604 may include:

- a similarity calculation sub-unit, configured to perform similarity calculation on the plurality of reference liveness features and the image feature to obtain a feature similarity between each reference liveness feature and the image feature;
- an index conversion sub-unit, configured to perform, based on a pre-set liveness discrimination criterion, index conversion on the feature similarity to obtain a target index corresponding to the feature similarity; and
- a comparison sub-unit, configured to compare the target index with a pre-set discrimination index to obtain the discrimination result.

In an embodiment, the feature extraction unit 602 may include:

- a pixel extraction sub-unit, configured to perform pixel extraction on the facial image to obtain pixel information of the facial image;
- a convolutional operation sub-unit, configured to perform convolutional operation on the pixel information to obtain convolutional information of the facial image;
- a normalization sub-unit, configured to normalize the convolutional information to obtain normalized information of the facial image; and
- a non-linear transformation sub-unit, configured to perform non-linear transformation on the normalized information to obtain a feature of the facial image.

In an embodiment, the feature mapping unit 603 may include:

- a full connection sub-unit, configured to perform full connection on the plurality of reference features to obtain fully connected information corresponding to the plurality of reference features;
- a classification sub-unit, configured to classify, based on the fully connected information, the plurality of reference features to obtain classification results corresponding to the plurality of reference features; and
- a mapping sub-unit, configured to map, based on the classification results, the plurality of reference features into a pre-set liveness feature space to obtain the plurality of reference liveness features.

In an embodiment, the liveness detection apparatus further includes:

- a model acquisition unit, configured to acquire a to-be-trained feature extraction model and a to-be-trained feature generation model;

a collection unit, configured to collect a plurality of facial image training samples and a reference feature sample set that includes reference feature samples conforming to the pre-set feature distribution, the reference feature sample set including a plurality of reference feature training samples; and a training unit, configured to train the to-be-trained feature extraction model and the to-be-trained feature generation model by using the plurality of facial image training samples and the plurality of reference feature training samples to obtain the pre-set feature extraction model and the pre-set feature generation model.

In an embodiment, the training unit may include:

a feature extraction sub-unit, configured to extract image sample features from the facial image training samples by using the to-be-trained feature extraction model;

a liveness feature mapping sub-unit, configured to perform liveness feature mapping on the plurality of reference feature training samples by using the to-be-trained feature generation model to obtain a plurality of sample liveness features;

a loss calculation sub-unit, configured to calculate feature loss information and distribution loss information corresponding to the image sample features based on the plurality of sample liveness features and the plurality of reference feature training samples; and a parameter adjustment sub-unit, configured to adjust parameters of the to-be-trained feature extraction model based on the feature loss information to obtain the pre-set feature extraction model, and adjust parameters of the to-be-trained feature generation model based on the distribution loss information to obtain the pre-set feature generation model.

In an embodiment, the loss calculation sub-unit may include:

a first loss calculation module, configured to calculate the feature loss information of the image sample features and the plurality of sample liveness features by using a pre-set discrimination module; and a second loss calculation module, configured to calculate the distribution loss information of the image sample features and the plurality of reference feature training samples by using a pre-set distribution fitting module.

In an embodiment, the liveness detection apparatus further includes:

an instruction receiving unit, configured to receive a liveness detection trigger instruction;

a video collection unit, configured to collect a to-be-detected video including the face of the to-be-detected object based on the liveness detection trigger instruction;

an image conversion unit, configured to convert the to-be-detected video into at least one to-be-detected image;

a facial detection unit, configured to perform facial detection on the at least one to-be-detected image to obtain a detection result; and an image determination unit, configured to determine the facial image from the at least one to-be-detected image based on the detection result.

In an embodiment, the image determination unit may include:

a facial discrimination sub-unit, configured to perform, based on the detection result, facial discrimination on the at least one to-be-detected image to obtain a discrimination result;

a facial image filtering sub-unit, configured to filter out an initial facial image from the at least one to-be-detected image based on the discrimination result;

a facial registration sub-unit, configured to perform facial registration on the initial facial image to obtain a location of at least one facial key point in the initial facial image;

a filtering sub-unit, configured to filter out a target facial key point from the at least one facial key point based on the location of the facial key point; and a generation sub-unit, configured to generate the facial image based on a location of the target facial key point.

During specific implementation, the foregoing units may be implemented as independent entities, or may be combined in different manners, or may be implemented as the same entity or several entities. For specific implementation of the foregoing units, refer to the foregoing method embodiments. Details are not described herein again.

Through the foregoing liveness detection apparatus, the accuracy and reliability of liveness detection may be improved.

Figure 10:
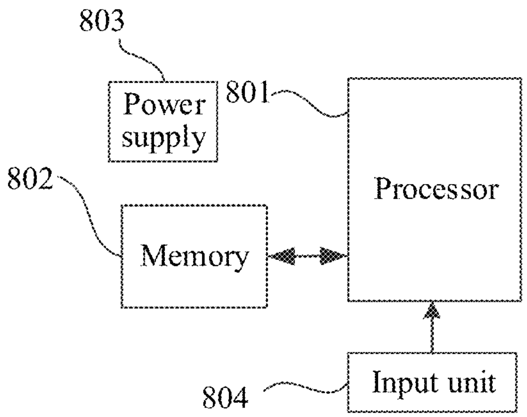
FIG. 10 is a schematic structural diagram of a computer device according to an embodiment of this application.

An embodiment of this application further provides a computer device, which may be a terminal or a server. For example, the computer device may be used as a liveness detection terminal, and the terminal may be a mobile phone or a tablet computer. As another example, the computer device may be a server such as a liveness detection server. FIG. 10 is a schematic structural diagram of a terminal involved in an embodiment of this application. Specifically, the computer device may include components such as a processor 801 including one or more processing cores, a memory 802 including one or more computer-readable storage media, a power supply 803, and an input unit 804. Those skilled in the art may understand that a structure of the computer device shown in FIG. 10 does not constitute a limitation on the computer device, and the computer device may include more or fewer components than those shown in the figure, or some components may be combined, or a different component deployment may be used.

The processor 801 is a control center of the computer device, and is connected to various parts of the entire computer device through various interfaces and lines. By running or executing a software program and/or a module stored in the memory 802, and invoking data stored in the memory 802, the processor performs various functions of the computer device and processes data, to perform overall monitoring on the computer device. The processor 801 may include one or more processing cores. The processor 801 may integrate an application processor and a modem. The application processor mainly processes an operating system, a user interface, an application program, and the like. The modem mainly processes wireless communication. It may be understood that the foregoing modem may also not be integrated into the processor 801.

The memory 802 may be configured to store a software program and a module. The processor 801 runs the software program and the module stored in the memory 802, to perform various functional applications and data processing. The memory 802 may mainly include a program storage area and a data storage area. The program storage area may store an operating system, an application program required by at least one function (such as a sound playback function and an image playback function), and the like. The data storage area may store data created according to use of the computer device. In addition, the memory 802 may include a high speed random access memory, and may also include a non-volatile memory, such as at least one magnetic disk storage device, a flash memory or another volatile solid-state storage device. Correspondingly, the memory 802 may further include a memory controller, to provide the processor 801 with access to the memory 802.

The computer device may further include the input unit 804. The input unit 804 may be configured to receive input numeric or character information and generate keyboard, mouse, joystick, optical or trackball signal input related to user settings and function control.

Although not shown in the figure, the computer device may further include a display unit and the like. Details are not described herein again. Specifically, in this embodiment, the processor 801 of the computer device may load, according to the following instructions, an executable file corresponding to processes of one or more application programs into the memory 802. The processor 801 runs the application programs stored in the memory 802, to implement the steps of the method and the functions of the apparatus of this application.

According to an aspect of this application, a computer program product or computer program is provided. The computer program product or computer program includes computer instructions. The computer instructions are stored in a computer-readable storage medium. A processor of a computer device reads the computer instructions from the computer-readable storage medium and executes the computer instructions, and the computer device is enabled to perform the method according to various implementations in the foregoing embodiments.

Those of ordinary skill in the art may understand that all or some steps of the methods in the foregoing embodiments may be implemented by a computer program, or implemented by a computer program by controlling relevant hardware. The computer program may be stored in a computer-readable storage medium and loaded and executed by a processor. The computer-readable storage medium may be a non-volatile storage medium.

Accordingly, an embodiment of this application further provides a computer-readable storage medium, which stores a computer program. The computer program can be loaded by a processor, to perform the steps of any liveness detection method according to the embodiments of this application.

The computer program stored in the computer-readable storage medium may perform the steps of any liveness detection method according to the embodiments of this application, so the beneficial effects that can be achieved by any liveness detection method according to the embodiments of this application may be achieved. For details, refer to the foregoing embodiments. Details are not described herein again.

The liveness detection method and apparatus, the computer device, and the computer-readable storage medium according to the embodiments of this application are described above in detail. Although the principles and implementations of this application are described by using specific examples in this description, the descriptions of the foregoing embodiments are merely intended to help understand the method and the core idea of the method of this application. Meanwhile, those skilled in the art may make modifications to the specific implementations and application range according to the idea of this application. In conclusion, the content of this description shall not be construed as a limitation on this application.

What is claimed is:

1. A liveness detection method, performed by a computer device, comprising:

acquiring a facial image of an object and a reference feature set, the reference feature set including a plurality of reference features conforming to a pre-set feature distribution;

extracting an image feature from the facial image, comprising:

extracting pixel information from the facial image;

performing convolutional operation on the pixel information to obtain convolutional information of the facial image;

normalizing the convolutional information to obtain normalized information of the facial image; and performing non-linear transformation on the normalized information to obtain the image feature;

performing liveness feature mapping on the plurality of reference features to obtain a plurality of corresponding reference liveness features;

performing, based on the plurality of reference liveness features, liveness discrimination on the image feature to obtain a discrimination result;

performing, based on the image feature, distribution fitting on the plurality of reference features to obtain a distribution fitting result; and performing liveness detection on the object based on the discrimination result and the distribution fitting result.

2. The method according to claim 1, wherein performing, based on the image feature, distribution fitting on the plurality of reference features to obtain the distribution fitting result includes:

performing gradient operation on the plurality of reference features to obtain gradient information of each reference feature;

converging, based on the image feature, the gradient information of each reference feature to obtain converged information of each reference feature; and determining the distribution fitting result based on the converged information of each reference feature.

3. The method according to claim 2, wherein determining the distribution fitting result based on the converged information of each reference feature includes:

performing, based on the converged information of each reference feature, distribution analysis on the image feature to obtain an image feature distribution, the image feature distribution being a feature distribution of a plurality of corresponding features obtained by reversely mapping the image feature into a pre-set liveness feature space used for liveness feature mapping for the plurality of reference features;

calculating a distribution similarity between the image feature distribution and the pre-set feature distribution; and comparing the distribution similarity with a pre-set distribution discrimination condition to obtain the distribution fitting result.

4. The method according to claim 1, wherein performing, based on the plurality of reference liveness features, liveness discrimination on the image feature to obtain the discrimination result includes:

performing similarity calculation on the plurality of reference liveness features and the image feature to obtain a feature similarity between each reference liveness feature and the image feature;

performing, based on a pre-set liveness discrimination criterion, index conversion on the feature similarities to obtain target indices corresponding to the feature similarities; and comparing the target indices with a pre-set discrimination index to obtain the discrimination result.

5. The method according to claim 1, wherein performing liveness feature mapping on the plurality of reference features to obtain the plurality of corresponding reference liveness features includes:

performing full connection on the plurality of reference features to obtain fully connected information corresponding to the plurality of reference features;

classifying, based on the fully connected information, the plurality of reference features to obtain classification results corresponding to the plurality of reference features; and mapping, based on the classification results, the plurality of reference features into a pre-set liveness feature space to obtain the plurality of reference liveness features.

6. The method according to claim 1, wherein:

extracting the image feature from the facial image includes extracting the image feature from the facial image by using a pre-set feature extraction model;

performing liveness feature mapping on the plurality of reference features to obtain the plurality of corresponding reference liveness features includes performing liveness feature mapping on the plurality of reference features by using a pre-set feature generation model to obtain the plurality of corresponding reference liveness features;

performing, based on the plurality of reference liveness features, liveness discrimination on the image feature to obtain the discrimination result includes performing, based on the plurality of reference liveness features, liveness discrimination on the image feature by using a pre-set discrimination module to obtain the discrimination result; and performing, based on the image feature, distribution fitting on the plurality of reference features to obtain the distribution fitting result includes performing, based on the image feature, distribution fitting on the plurality of reference features by using a pre-set distribution fitting module to obtain the distribution fitting result.

7. The method according to claim 6, further comprising:

acquiring a feature extraction model and a feature generation model;

collecting a plurality of facial image training samples and a reference feature sample set that comprises reference feature samples conforming to the pre-set feature distribution, the reference feature sample set includes a plurality of reference feature training samples; and training the feature extraction model and the feature generation model by using the plurality of facial image training samples and the plurality of reference feature training samples to obtain the pre-set feature extraction model and the pre-set feature generation model.

8. The method according to claim 7, wherein training the feature extraction model and the feature generation model by using the plurality of facial image training samples and the plurality of reference feature training samples to obtain the pre-set feature extraction model and the pre-set feature generation model includes:

extracting image sample features from the facial image training samples by using the feature extraction model;

performing liveness feature mapping on the plurality of reference feature training samples by using the feature generation model to obtain a plurality of sample liveness features;

calculating feature loss information and distribution loss information corresponding to the image sample features based on the plurality of sample liveness features and the plurality of reference feature training samples; and adjusting, based on the feature loss information, parameters of the feature extraction model to obtain the pre-set feature extraction model, and adjusting, based on the distribution loss information, parameters of the to-be-trained feature generation model to obtain the pre-set feature generation model.

9. The method according to claim 8, wherein calculating the feature loss information and the distribution loss information corresponding to the image sample features based on the plurality of sample liveness features and the plurality of reference feature training samples includes:

calculating the feature loss information of the image sample features and the plurality of sample liveness features by using the pre-set discrimination module; and calculating the distribution loss information of the image sample features and the plurality of reference feature training samples by using the pre-set distribution fitting module.

10. The method according to claim 1, further comprising, before acquiring the facial image of the object:

receiving a liveness detection trigger instruction;

collecting a video including a face of the object based on the liveness detection trigger instruction;

converting the video into at least one image;

performing facial detection on the at least one image to obtain a detection result; and determining the facial image from the at least one image based on the detection result.

11. The method according to claim 10, wherein determining the facial image from the at least one image based on the detection result includes:

performing, based on the detection result, facial discrimination on the at least one image to obtain a discrimination result;

obtaining an initial facial image from the at least one image by filtering based on the discrimination result;

performing facial registration on the initial facial image to obtain a location of at least one facial key point in the initial facial image;

obtaining a target facial key point from the at least one facial key point by filtering based on the location of the facial key point; and generating the facial image based on a location of the target facial key point.

12. A computer device comprising:

one or more memories storing one or more application programs; and one or more processors configured to run the one or more application programs to:

acquire a facial image of an object and a reference feature set, the reference feature set including a plurality of reference features conforming to a pre-set feature distribution;

extract an image feature from the facial image, comprising:

extracting pixel information from the facial image;

performing convolutional operation on the pixel information to obtain convolutional information of the facial image;

normalizing the convolutional information to obtain normalized information of the facial image; and performing non-linear transformation on the normalized information to obtain the image feature;

perform liveness feature mapping on the plurality of reference features to obtain a plurality of corresponding reference liveness features;

perform, based on the plurality of reference liveness features, liveness discrimination on the image feature to obtain a discrimination result;

perform, based on the image feature, distribution fitting on the plurality of reference features to obtain a distribution fitting result; and perform liveness detection on the object based on the discrimination result and the distribution fitting result.

13. The device according to claim 12, wherein the one or more processors are further configured to run the one or more application programs to:

perform gradient operation on the plurality of reference features to obtain gradient information of each reference feature;

converge, based on the image feature, the gradient information of each reference feature to obtain converged information of each reference feature; and determine the distribution fitting result based on the converged information of each reference feature.

14. The device according to claim 13, wherein the one or more processors are further configured to run the one or more application programs to:

perform, based on the converged information of each reference feature, distribution analysis on the image feature to obtain an image feature distribution, the image feature distribution being a feature distribution of a plurality of corresponding features obtained by reversely mapping the image feature into a pre-set liveness feature space used for liveness feature mapping for the plurality of reference features;

calculate a distribution similarity between the image feature distribution and the pre-set feature distribution; and compare the distribution similarity with a pre-set distribution discrimination condition to obtain the distribution fitting result.

15. The device according to claim 12, wherein the one or more processors are further configured to run the one or more application programs to:

perform similarity calculation on the plurality of reference liveness features and the image feature to obtain a feature similarity between each reference liveness feature and the image feature;

perform, based on a pre-set liveness discrimination criterion, index conversion on the feature similarities to obtain target indices corresponding to the feature similarities; and compare the target indices with a pre-set discrimination index to obtain the discrimination result.

16. The device according to claim 12, wherein the one or more processors are further configured to run the one or more application programs to:

perform full connection on the plurality of reference features to obtain fully connected information corresponding to the plurality of reference features;

classify, based on the fully connected information, the plurality of reference features to obtain classification results corresponding to the plurality of reference features; and map, based on the classification results, the plurality of reference features into a pre-set liveness feature space to obtain the plurality of reference liveness features.

17. The device according to claim 12, wherein the one or more processors are further configured to run the one or more application programs to:

extract the image feature from the facial image by using a pre-set feature extraction model;

perform liveness feature mapping on the plurality of reference features by using a pre-set feature generation model to obtain the plurality of corresponding reference liveness features;

perform, based on the plurality of reference liveness features, liveness discrimination on the image feature by using a pre-set discrimination module to obtain the discrimination result; and perform, based on the image feature, distribution fitting on the plurality of reference features by using a pre-set distribution fitting module to obtain the distribution fitting result.

18. A non-transitory computer-readable storage medium, storing a plurality of instructions that, when loaded and executed by a processor, cause the processor to:

acquire a facial image of an object and a reference feature set, the reference feature set including a plurality of reference features conforming to a pre-set feature distribution;

extract an image feature from the facial image, comprising:

extracting pixel information from the facial image;

performing convolutional operation on the pixel information to obtain convolutional information of the facial image;

normalizing the convolutional information to obtain normalized information of the facial image; and performing non-linear transformation on the normalized information to obtain the image feature;

perform liveness feature mapping on the plurality of reference features to obtain a plurality of corresponding reference liveness features;

perform, based on the plurality of reference liveness features, liveness discrimination on the image feature to obtain a discrimination result;

perform, based on the image feature, distribution fitting on the plurality of reference features to obtain a distribution fitting result; and perform liveness detection on the object based on the discrimination result and the distribution fitting result.

* * * * *